United States Patent
Flannaghan

Patent Number: 5,526,057
Date of Patent: Jun. 11, 1996

[54] VIDEO STORAGE

[75] Inventor: Barry Flannaghan, Winchester, England

[73] Assignee: Snell & Wilcox Limited, Hampshire, United Kingdom

[21] Appl. No.: 307,637

[22] PCT Filed: Mar. 30, 1993

[86] PCT No.: PCT/GB93/00656

§ 371 Date: Sep. 22, 1994

§ 102(e) Date: Sep. 22, 1994

[87] PCT Pub. No.: WO93/20659

PCT Pub. Date: Oct. 14, 1993

[30] Foreign Application Priority Data

Mar. 30, 1992 [GB] United Kingdom .................. 9206887

[51] Int. Cl.[6] .................................................. H04N 5/46
[52] U.S. Cl. .................. 348/557; 348/555; 348/642; 348/717
[58] Field of Search ............................ 348/180, 181, 348/554, 555, 557, 558, 717, 715, 638, 642

[56] References Cited

U.S. PATENT DOCUMENTS

| 4,012,772 | 3/1977 | Chamgers et al. |
| 4,272,787 | 6/1981 | Michael et al. ........................ 358/160 |
| 4,689,660 | 8/1987 | Kashigi .................................... 358/11 |
| 4,922,329 | 5/1990 | Wilkinson .............................. 358/12 |
| 5,192,997 | 3/1993 | Imbert et al. ........................ 348/558 |

FOREIGN PATENT DOCUMENTS

| 2943271 | 5/1981 | Germany . |
| 4018812 | 12/1990 | Germany . |

*Primary Examiner*—Victor R. Kostak
*Assistant Examiner*—Juan Gabriel Acosta
*Attorney, Agent, or Firm*—Lowe, Price, LeBlanc & Becker

[57] ABSTRACT

A video storage arrangement produces a continuous video signal representing a test pattern. One luminance frame store is provided and two chrominance frame stores. A selection can be made between NTSC, PAL and SECAM modes. Switches are provided for selecting between chrominance frame stores and between inverting and non-inverting mode. Depending upon the selected broadcast standard, these switches are driven from field and line clock signals to generate the required output field sequence in YC or composite form.

11 Claims, 1 Drawing Sheet

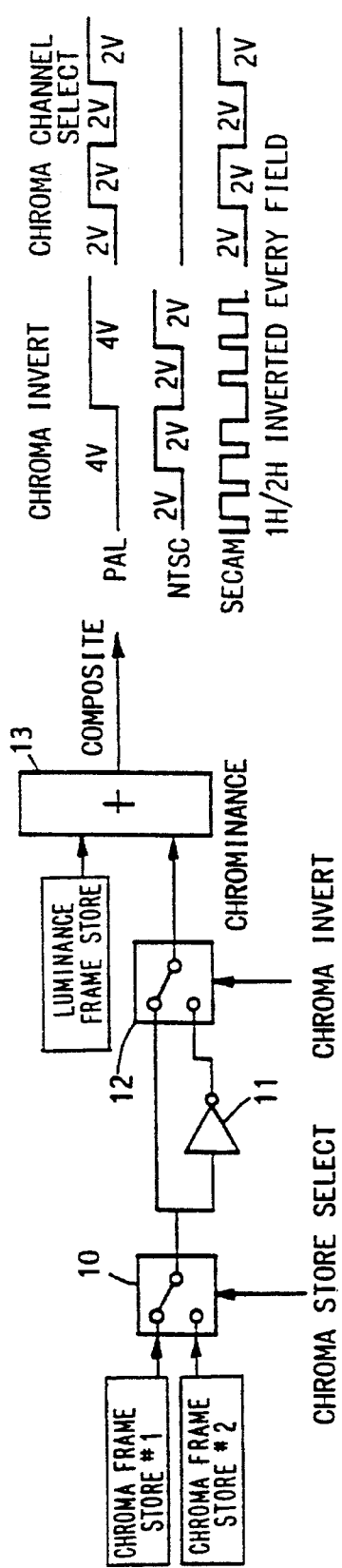
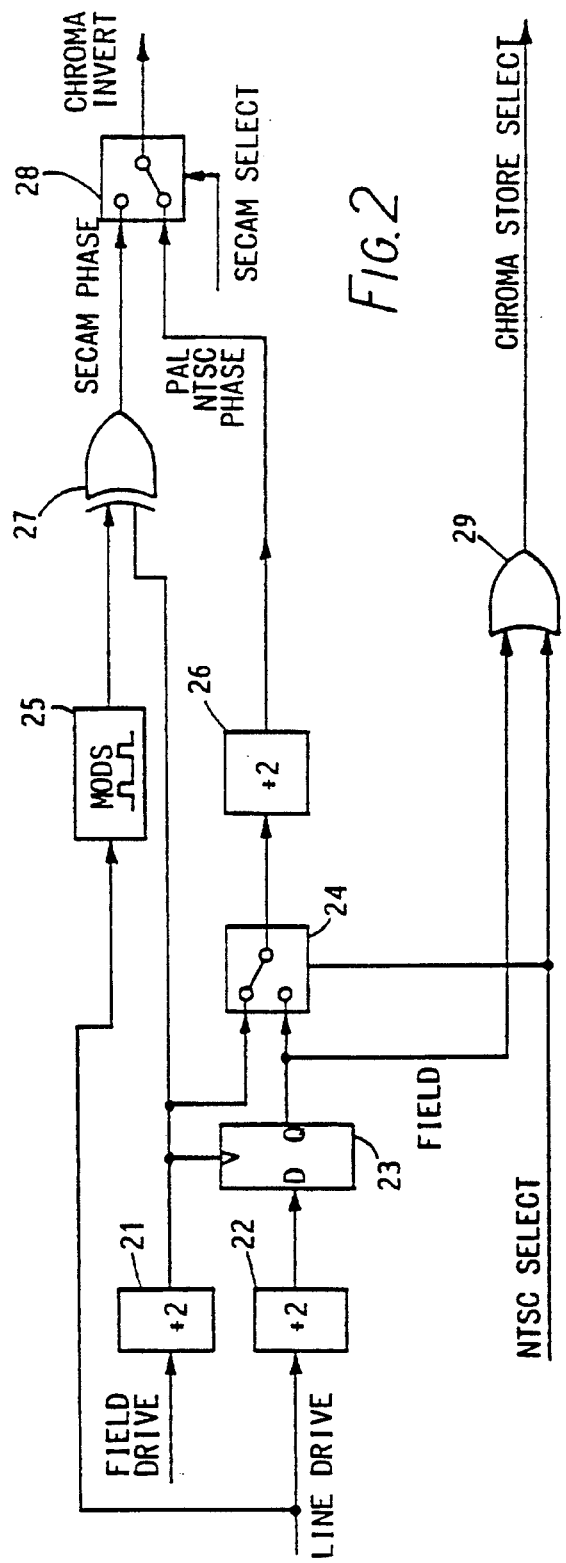
FIG.1
FIG.2
FIG.3

VIDEO STORAGE

This invention relates to the storage and processing of video information for the purpose, in specific examples, of generating a video store or a test pattern.

It is a relatively straightforward matter to construct a store capable of holding one frame of video in YUV or RGB form. Two field stores will suffice. In order to produce a continuous video signal representing, for example, a fixed test pattern, the YUV or RGB output from the field stores will be passed through an encoder operated in PAL, NTSC or SECAM, for example. Encoders, particularly SECAM encoders, are relatively expensive and it would thus be an advantage to have a video store capable of holding luminance and chrominance information already encoded in the desired standard. In circumstances where multi-standard outputs are required, there will be a still greater advantage in storing encoded rather than RGB or YUV information, since the alternative would be to provide essentially three separate encoders.

It will be recognised that in standards such as PAL, NTSC and SECAM, there is a repeating field sequence that extends over more than one frame. This means that a single constant frame of RGB or YUC cannot be represented as a single constant frame of encoded signal. PAL for example has an eight field sequence. An attempt to produce a test pattern in PAL using only two stored fields would introduce chrominance structure which, certainly in the professional environment, would be entirely unacceptable. However, the requirement of eight field storage for a single frame would make the video store extremely expensive. The position is worse if the store is required to provide separate Y and C outputs since two further fields of luminance Storage would be required. A ten field still frame video store would at present hardware costs probably be regarded as prohibitively expensive.

It is an object of this invention to provide improved video storage enabling the generation of a video still, test pattern or other single image which is capable of holding encoded luminance and chrominance signals.

It is a further object of this invention to provide such field storage with economical use of field stores.

In a still further object of certain aspects of this invention to provide for field storage in a manner which can accommodate a range of broadcast standards.

Accordingly, the present invention consists in one aspect in video store means comprising a luminance store for holding one frame of luminance information; chrominance store means for holding at least one frame of chrominance information, the stored luminance and chrominance being encoded to a selected broadcast standard; chrominance channel means communicating with the chrominance store means and providing inverted and non-inverted modes; and channel control means for so controlling the chrominance channel as to provide a continuous video signal in composite or YC form representing a video still, test pattern or other single image.

Advantageously, the chrominance store means comprises first and second chrominance frame stores, the channel control means serving to select both between inverted and non-inverted modes and between first and second chrominance frame stores.

Suitably, the chrominance channel control means can operate, selectively, to produce video signals according to PAL, NTSC or SECAM broadcast standards.

With the use, in one example, of only six fields of storage, the present invention is able to provide video signals according to the PAL eight field sequence, the NTSC four field sequence and the SECAM twelve field sequence. A single piece of hardware can receive video information according to any one of the three standards and provide a continuous test pattern, for example.

The invention will now be described by way of example with reference to the accompanying drawings in which:

FIG. 1 is a block diagram illustrating one embodiment of the present invention;

FIG. 2 is a logic diagram illustrating control circuitry for use with the arrangement of FIG. 1; and FIG. 3 is a series of timing diagrams illustrating the operation of the present invention.

It has been recognised by the present inventors that the eight field PAL sequence can be reproduced completely by the use of two chrominance frame stores and a chrominance inverter. Referring to FIG. 1, outputs from the respective chrominance frame stores CHROMA FRAME 1 and CHROMA FRAME 2 are received by switcher 10 having a CHROMA STORE SELECT control port. The output from the switcher 10 is taken in two parallel paths to a further switcher 12; one path is direct, the other includes inverter 11. The switcher 12 has a CHROMA INVERT control port. The chrominance output from the switcher 12 is combined with luminance in adder 13 providing a composite video output. The luminance and chrominance channels are clocked at the same rate. Each of the three frame stores may for example comprise i Megabyte of DRAM.

The logic circuitry which serves to drive the CHROMA STORE SELECT and CHROMA INVERT control lines is illustrated in FIG. 2. The control logic consists of three binary dividers 21, 22 and 26; a D-type flip-flop 23, switches 24 and 28, modulo-3 counter 25; exclusive OR gate 27 and OR gate 29.

The logic circuitry receives SECAM SELECT and NTSC SELECT control inputs, the selection of PAL being implied by the absence of a control input. There are, additionally, FIELD DRIVE and LINE DRIVE inputs comprising a pulse per field and a pulse per line, respectively.

The simplest case is that of NTSC. In the NTSC mode, switches 24 and 28 take the positions shown in the drawing. Field drive pulses are counted by dividers 21 and 26 providing the necessary CHROMA INVERT signal for the inversion of chroma phase on a frame-by-frame basis. The NTSC SELECT command closes gate 29, effectively disabling the CHROMA STORE SELECT command so that only one chrominance frame store is employed.

In PAL mode, the position of switch 24 is reversed so that the output of divider 22 is re-clocked in flip-flop 23 providing a four field signal. The further division in divider 26 provides a CHROMA INVERT SIGNAL which serves to invert the chrome phase after four fields. The signal from flip-flop 23 also passes through open gate 29 and provides the necessary CHROMA STORE SELECT signal for the switching on a frame-by-frame basis of the two chrominance date streams in the switcher 10.

In SECAM mode the data streams from the two chrominance stores are non-standard chrominance signals obtained by frequency modulation of start-stop sub-carrier by Dr/Db sequence. The standard HF pre-emphasis is applied but without initial sub-carrier phase switching required for every third line and every even field. The necessary CHROMA INVERT SIGNAL to carry out this chroma phase switching is provided (with the position of switch 28 reversed) through exclusive OR gate 27 receiving a modulo-3 line drive input from counter 25 and a divide by 2 field drive input, from binary divider 21.

In summary, CHROMA FRAME 1 is used in the NTSC mode to store one frame of chroma information which is inverted (as shown in FIG. 3) every two fields, that is to say on a frame by frame basis. For PAL, the CHROMA FRAME 1 store holds fields 1 and 2 and CHROMA FRAME 2 fields 3 and 4 of the PAL 8 field sequence. Fields 5, 6, 7 and 8 are produced through inversion. The timing of the CHROMA INVERT and CHROMA CHANNEL SELECT signals is again shown in FIG. 3. In the SECAM mode the CHROMA FRAME 1 and CHROMA FRAME 2 stores hold four fields of chrominance modulated by Dr/Db sequence without initial phase switching. This switching is provided through the exclusive OR'ing of a modulo 3 signal and a divide by 2 field signal.

It will be understood that a variety of other logic circuits could be employed to produce the necessary CHROMA INVERT and CHROMA STORE SELECT signals, including those necessary to lock the sequence phase to that of an external reference. The described use in the PAL mode, of a flip-flop receiving as a D input a divide by 2 line drive input, facilitates this phase locking. It will be possible, however, to operate in an alternative arrangement with a simple divide by 2 counter.

Whilst the described embodiment is able to deal selectively with NTSC, PAL or SECAM, alternative embodiments can be produced which operate with one standard only.

This invention will find wide application in video still stores, test pattern generators and the like. Outputs can optionally be taken as composite signals or as YC signals. It would also be possible to provide outputs in the D2 digital form. In certain cases, the chrominance channel selector and the control logic will be provided independently to receive luminance and first and second chrominance data streams from a separate source. The described arrangements may be housed as stand-alone devices or combined with a variety of other forms of video equipment.

I claim:

1. Video store means comprising a luminance store for holding one frame of luminance information; chrominance store means for holding at least one frame of chrominance information; the stored luminance and chrominance being encoded to a selected broadcast standard; chrominance channel means communicating with the chrominance store means and providing inverted and non-inverted modes; and channel control means for controlling the chrominance channel as to provide a continuous video signal in composite or YC form representing a video still, test pattern or other single image.

2. Store means according to claim 1, wherein the chrominance store means comprise first and second chrominance frame stores, the channel control means serving to select both between inverted and non-inverted modes and between first and second chrominance frame stores.

3. Store means according to claim 1, wherein the chrominance channel means comprises first and second parallel signal paths and switch means for selecting between the said signal paths, there being provided an inverter in the first signal path.

4. Store means according to claim 2, adapted to operate selectively in NTSC and PAL modes, said channel control means serving in the NTSC mode to switch between inverted and non-inverted modes on a frame-by-frame basis and serving in the PAL mode to switch between inverted and non-inverted modes on a four field basis and to switch between first and second chrominance stores on a two field basis.

5. Store means according to claim 2, adapted to operate in a SECAM mode, said channel control means serving to switch between inverted and non-inverted modes on a field by field basis, to switch between inverted and non-inverted modes every third line and to switch between first and second chrominance stores on a two field basis.

6. Video store signal processing means comprising a luminance channel for communication with a luminance store holding one frame of luminance information encoded to a selected broadcast standard; a chrominance channel for communication with first and second chrominance stores each holding one frame of chrominance information encoded to the said broadcast standard, said chrominance channel having first switch means for selecting between first and second chrominance stores, inverter means and second switch means for switching between inverted and non-inverted modes, and channel control means adapted to receive a standard select input and serving to control the first and second switches of the chrominance channel to derive a continuous video signal in composite or YC form representing a video still, test pattern or other single image in a selected one of at least two different broadcast standards from the group consisting of NTSC, PAL and SECAM.

7. A method for producing a continuous chrominance signal representative of the chrominance in a video still, test pattern or other single image, comprising holding up to two frames of chrominance information and inverting signal phase in a repeating multiple field-based sequence to generate a chrominance signal to a broadcast standard.

8. A method according to claim 7, comprising holding two frames of chrominance information and switching between frame stores in a repeating sequence.

9. A method according to claim 8, serving to produce a chrominance signal to the PAL, NTSC or SECAM broadcast standards.

10. A method according to claim 7, comprising the step of holding a corresponding frame of luminance information and generating a YC or composite video signal.

11. Video store means comprising a luminance frame store; first and second chrominance frame stores; chrominance channel means communicating with the chrominance frame store and providing inverted and non-inverted modes and channel control means serving to switch between inverted and non-inverted modes on a field-by-field basis; to switch between inverted and non-inverted modes every third line and to switch between first and second chrominance stores on a two-field basis thereby to provide a continuous video signal to the SECAM broadcast standard representing a video still, test pattern or other single image.

* * * * *